Figure 1:
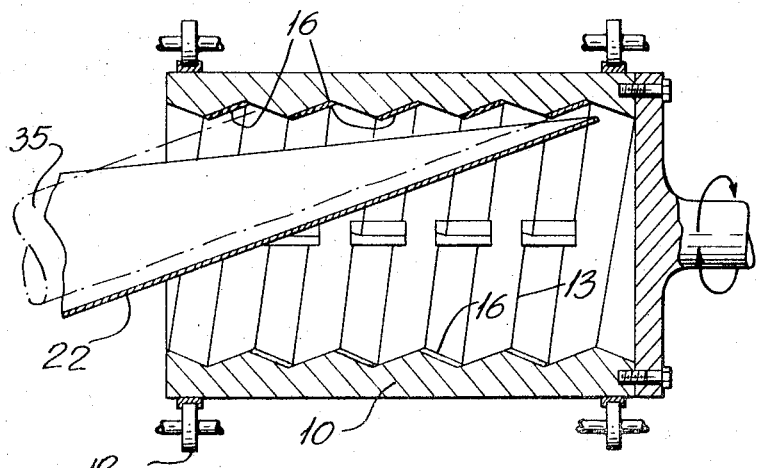

Feb. 21, 1967  H. ALTOSAAR  3,304,970
AXIAL FEED WAFERIZER
Filed March 3, 1964  6 Sheets-Sheet 1

INVENTOR
Heino ALTOSAAR

AGENT

INVENTOR
Heino ALTOSAAR

AGENT

INVENTOR
Heino ALTOSAAR

AGENT

INVENTOR
Heino ALTOSAAR

INVENTOR
Heino ALTOSAAR
AGENT

Feb. 21, 1967  H. ALTOSAAR  3,304,970
AXIAL FEED WAFERIZER
Filed March 3, 1964  6 Sheets-Sheet 6
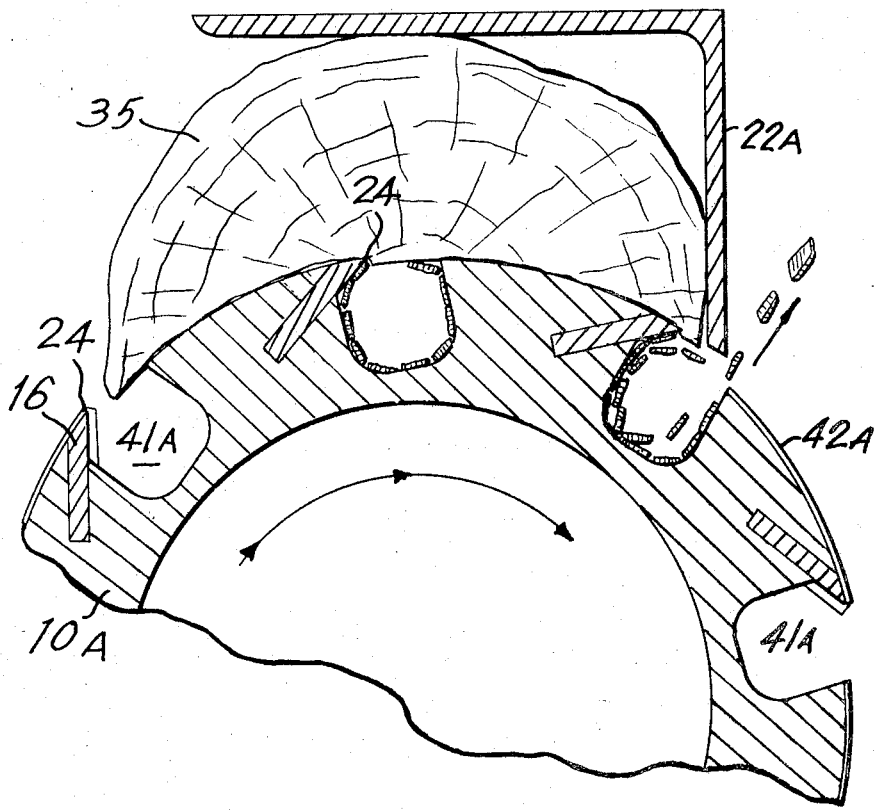
Fig_10
INVENTOR
Heino ALTOSAAR
AGENT 3,304,970
AXIAL FEED WAFERIZER
Heino Altosaar, Baie d'Urfe, Quebec, Canada, assignor to Dominion Tar & Chemical Company, Limited, Montreal, Quebec, Canada
Filed Mar. 3, 1964, Ser. No. 349,038
16 Claims. (Cl. 144—162)

This invention relates to chipping of wood to form wafers, to be used in the production of wood pulp, more particularly to an apparatus for chipping wafers from logs while continuously advancing said logs.

Conventional chippers operate to reduce wood to chips by the action of a wedge-shaped cutting edge extending across the fibres so that the main cutting action severs the fibres. With this type of cutting, a compressive force is applied to the ends of the fibres as the wedge-shaped cutting blade penetrates into the wood. The wedging action of the cutting blade separates the wood into chips by shearing along the grain of the wood while simultaneously causing considerable bruising of the fibres and reducing the quality of the chip produced. Also, thickness of the chips is variable particularly when cut from zones of crooked grain. For example, chips cut in the vicinity of knots are normally of highly variable thickness.

In view of the above shortcomings of conventional chipping, more and more attention has been given to the desirability of producing wafers. In wafering, the main knife edge is presented parallel to the fibres in the wood and is moved across the log to cut a veneer-like segment from the log. A second subsidiary cutting edge may be provided to sever across the fibres to separate a wafer from the log.

Prior to the present invention, machines for producing wafers for pulping purposes did not operate in a continuous manner on tree length or random length logs. Thus, with prior art systems, poles are first sized into suitable length bolts for insertion into a hopper or magazine on the waferer and these bolts are then fed to the chipper head with a motion at right angles to the bolt axis. These hoppers in turn require complex feed means to move the sized bolts against the periphery of the drum.

It is thus the main object of this invention to provide a system for continuously producing wafer type chips from logs which may be of random length, while feeding said logs end to end to the waferer.

It is a further object to provide a more uniform feed for a continuous wafer chipping mechanism which does not require elaborate feed means.

The wafer of the present invention has specific characteristics not found in wafers presently known for pulping purposes. Applicant's wafer is distinctive in shape, taking the form of a parallelepiped bounded by six rhomboid planes. Thus, applicant's wafer may be described as having a rhomboidal parallelepiped configuration. The main or larger faces of applicant's rhomboidal parallelepiped wafer are produced by a cut substantially parallel to the grain while the two side edges are cut across and at an angle to the grain. Thus, a cross-grained ribbon of wood is severed from the log by a cut parallel to the grain and a second cut across and at an angle to the grain. The remaining two end surfaces of each wafer are formed when the ribbon produced in the above manner is split along the grain to separate individual wafers.

It is a further object of the invention to provide parallelepiped wafers which simulate conventional wood chips in shape and length and therefore do not require special handling techniques. However, the parallelepiped wafer has the advantage of substantially uniform structure as compared with the random thickness of conventional chips.

Broadly, the present invention provides an apparatus having a plurality of knives mounted in a spiral or helical pattern thereon to successively engage a log and reduce same to wafers.

Figure 2:
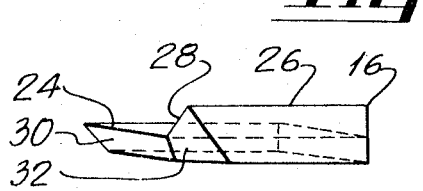
Figure 11:
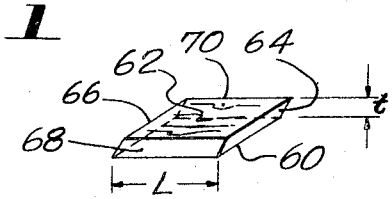
Figure 3:
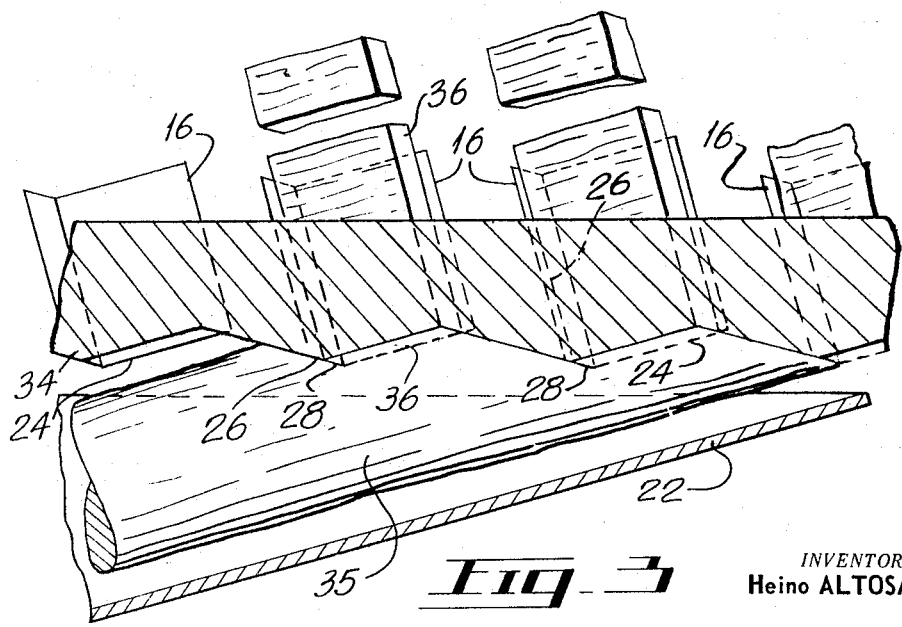
Figure 4:
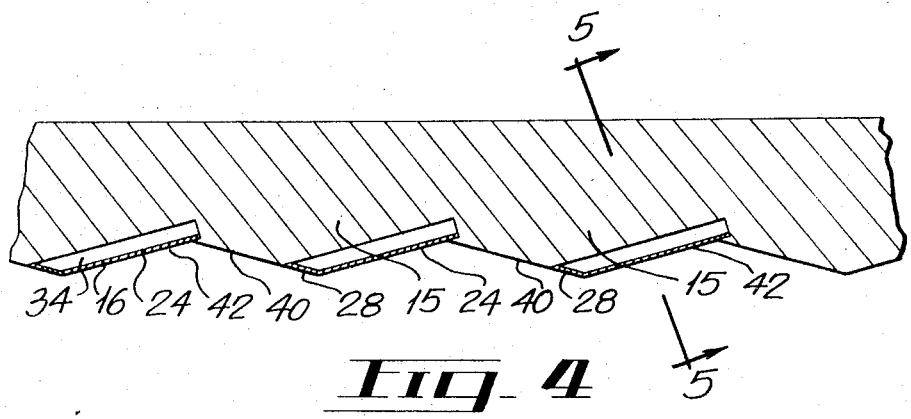
Figure 5:
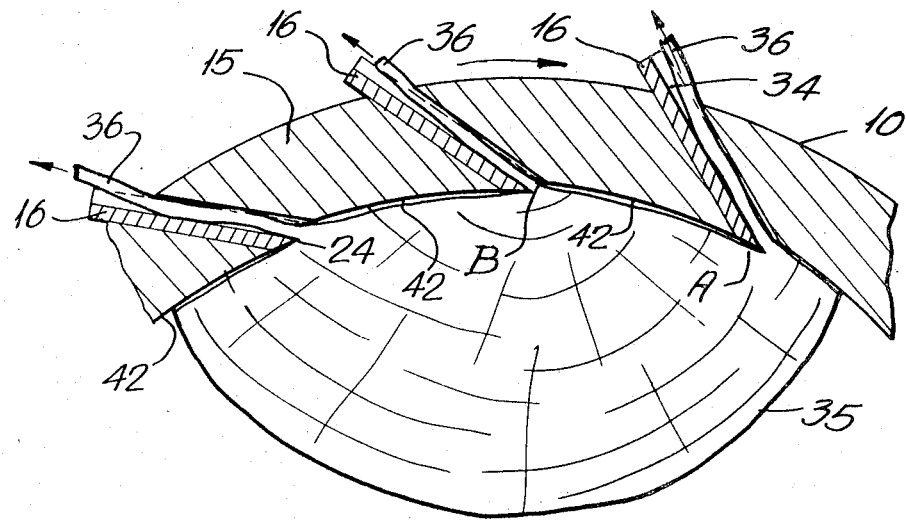
Figure 6:
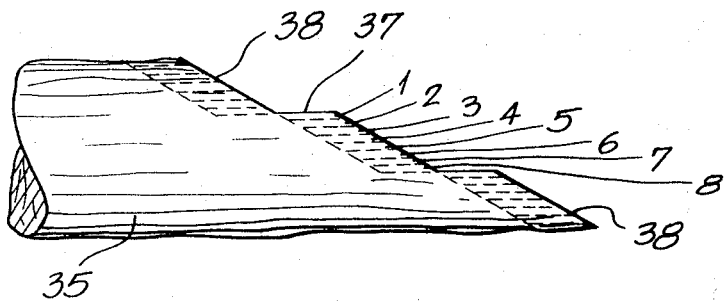
Figure 7:
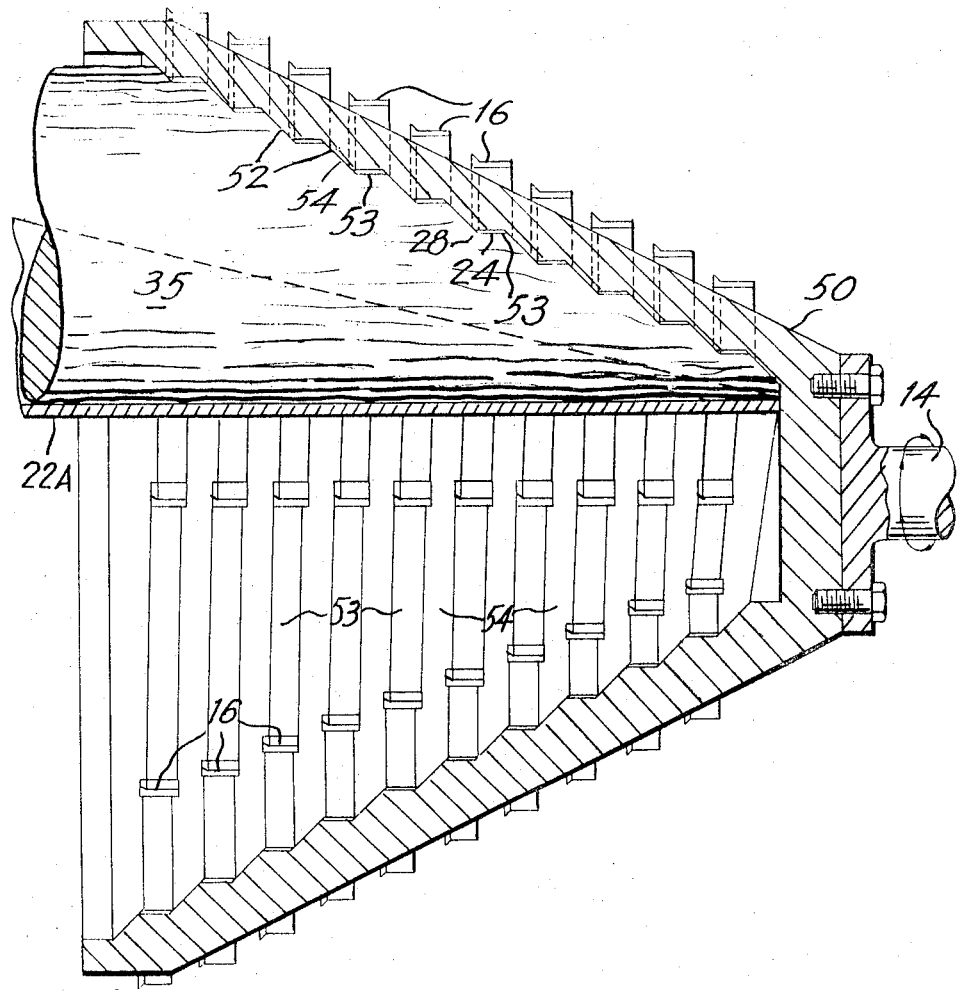
Figure 8:
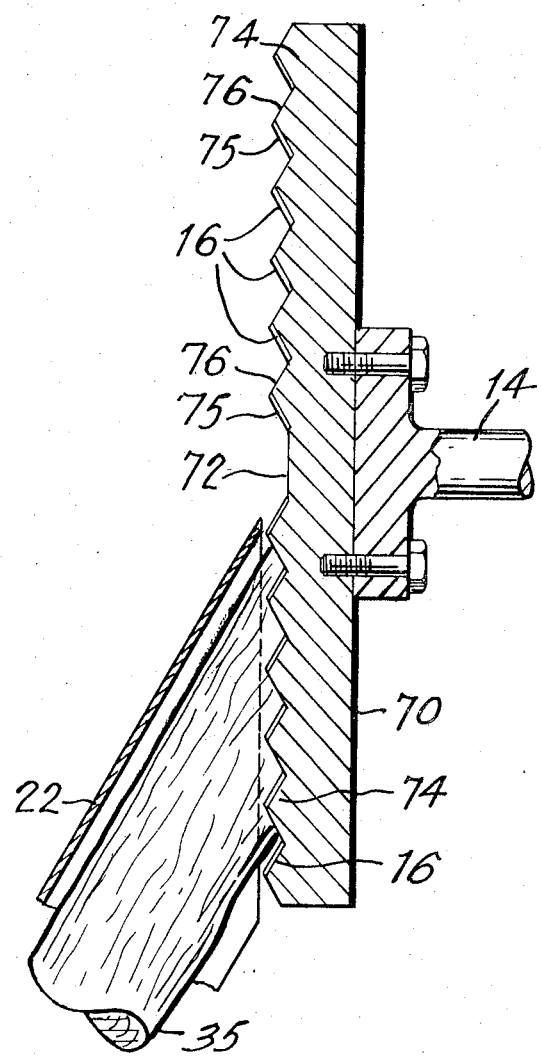
Figure 9:
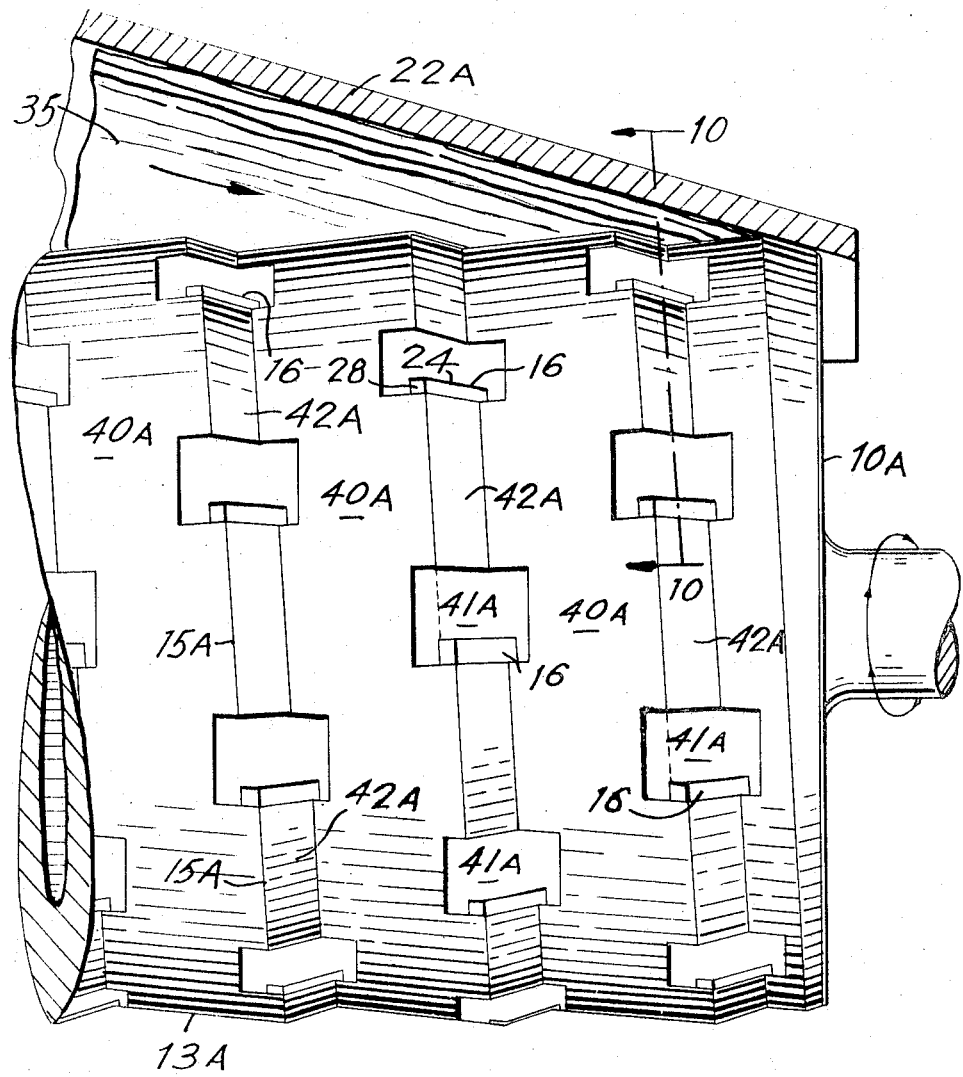

Further features of the present invention will be evident from the following detailed description taken in conjunction with the accompanying drawing in which:

FIG. 1 is a section view of one embodiment of the invention.
FIG. 2 is a view of one type of knife that may be used with the present invention.
FIG. 3 is a radial section schematically illustrating knives cutting the wood.
FIG. 4 is an axial cross section of the drum of FIG. 1 showing the configuration of the ridge.
FIG. 5 is a section along the line 5—5 of FIG. 4.
FIG. 6 schematically illustrates a sequence of cuts on a log by a plurality of knives.
FIG. 7 illustrates a second embodiment of the invention.
FIG. 8 shows a further embodiment of the invention.
FIG. 9 is a schematic illustration of a section of a drum incorporating a preferred form of the present invention.
FIG. 10 is a partial section view taken along the line 10—10 of FIG. 9.
FIG. 11 is a perspective view of a wafer formed using the present invention.

Referring to FIG. 1, there is shown a drum 10 mounted for rotation about its longitudinal axis on bearings 12. Suitable drive means may be coupled to the shaft 14 extending from the rear of the drum. The inner surface 20 of the drum 10 is provided with a screw thread or spiral or helical arrangement of a plurality of knives 16 extending from one face of a ridge 13. A suitable V-shaped cross section trough 22 directs the wood against the drum.

Before considering the waferer in detail, reference is first made to FIG. 2 which illustrates the type of knife preferred for operation with the present invention. As is evident, the knife 16 includes a main cutting edge 24 for cutting parallel to the grain and a wing section 26 having a cutting edge 28 for cutting across and at an angle to the grain. The knife is ground as indicated at 30 for edge 24 and at 32 for edge 28.

The general layout of the drum 10, knives 16, ridge 13 and trough 22 will now be explained with reference to FIGS. 3 and 4. FIG. 3, which is an axial section on a plane passing through the vertex of the trough 22, shows the knives 16 with their edges 24 parallel to a line traced by the vertex of the trough 22. When viewed in the plane through the vertex of trough 22, the cutting edges 24 of the knives 16 should be set parallel to the line traced by the vertex of said trough 22 and thus, the edges 24 in said plane should be parallel to the axis of the log 35 and the direction of feed of the log 35. More generally, the main cutting edges 24 will preferably be set so they are substantially parallel to the direction of feed or grain of the wood at the mid-point of their engagement with the log. (This relationship holds for all logs when using a V-shaped trough extending axially of the drum, but only for average logs with an L-shaped trough as will be more fully explained hereinafter.) In any other axial plane through the device, the above relationship of knife edge to feed will not be exactly accurate, however, by correlating the size of the drum and maximum size of log to be fed to the drum, this relationship will not be greatly disturbed. It is preferred to design a unit so that the maximum size log fed to the device is less than ⅔ the diameter of the unit. Also, the thickness and length of the wafer will be substantially constant if the above relationship of drum to log is maintained.

Knives 16 are arranged about the drum 10 on a helix angle which is primarily determined by the effective cutting length of edge 24 (i.e. the length of wafer cut); the angle between edges 24 and 28 of the knife; the angle between the edge 24 and the axis of the drum; the number of knives per 360°; thickness of wafer cut and the diameter at which the knives are mounted. Of course, if more than a single helical arrangement of knives is used, the helix angle of the knife arrangement will also depend on the number of helical arrangements. It is usually preferred to use more than one helical arrangement of knives to facilitate balancing for higher speed operation.

The angle of the wing of the knife, the number of knives per revolution, the length of cutting edge 24 and the depth of cut per knife will be the factors determining the angle at which the trough 22 will be set to the longitudinal axis of the drum. In other words, the shape and size of the wafers cut and the number of wafers cut per revolution for a given unit govern the direction of longitudinal feed of the log. Thus, the feed is at an angle to the axis of the drum or cutting head and is usually also along a plane axially of the drum.

Since the knife edge 24 and the direction of feed are substantially parallel as above described, the edge 24 engages and cuts the wood with a cut substantially parallel to the grain. The cutting edge 28 of the wing 26 engages the wood across and at an angle to the grain and the combined action of the edges 24 and 28 separates a ribbon 36 of wood from the log 35 being processed. This ribbon 36 leaves the interior of the drum 10 via a passageway 34 provided for this purpose through the drum.

The length of wafer produced by the above-described cutting action measured in the direction of the grain of wood is primarily determined by the length of cutting edge 24, assuming proper feeding. Wafer thickness is preset in designing the device.

The helical ridge 13 through which the blades 16 extend into the drum 10, serves two important functions, namely, that of preventing over-feeding and that of steadying the log presented to the machine (see FIGS. 1, 3, 4 and 5). To accomplish the above, the ridge 13 may be formed as a plurality of discrete sections 15, one section trailing each knife 16. Each of these sections 15 has a first surface 40 which limits the penetration of the log into the drum and thus prevents overfeeding, and a second surface 42 which serves to steady the log. These surfaces 40 and 42 combine to form sections 15 which are in effect segments of a tapering thread.

These sections 15 may also be combined by extending the surfaces 40 to form a continuous wall or face on a ridge such as ridge 13.

Referring particularly to FIGS. 4 and 5, it is evident that the axial length of the surface 42 is governed by the length of wafer to be cut. This wafer length governs the length of the cutting edge 24, it being usually preferred to have the edge 24 and passage 34 extend slightly into the adjacent section 15 to ensure separation of the ribbon 36 of wood from the log 35 (see FIGS. 3 and 4). Surface 40, on the other hand, is a projection of the cutting edge 28 as viewed in an axial plane through the ridge 15. The edges 24 and 28 may extend slightly beyond the surfaces 42 and 40 respectively to allow a slight amount of clearance and thus reduce friction loss. It is important that all the blades or knives 16 be accurately arranged on the waferer for most effective operation.

It is evident from FIG. 4 that the axial cross sections of the section 15 are V-shaped, the length of one side being set by the effective axial length of the cutting edge 24 (surface 42) while the length of each face 40 is equal to the effective length of cutting edge 28 in the axial plane multiplied by the number of knives per 360° of the helix. The angle of the cutting edges 24, relative to the axis of the drum, is the same as the angle of the feed of the log as above-described. The included angle between the surfaces 40 and 42 is, of course, determined by the angle between the edges 24 and 28 as viewed in said axial plane.

The vertex angle or the angle between surfaces 40 and 42 of each section 15 more specifically depends on the angle of the longitudinal axis of a knife 16 to a tangent to the drum (the angle of attack of the knives to the wood), the angle of the longitudinal axis of the knife 16 and the axis of the drum, and the angle of the wing knife edge 28 to the main cutting edge 24.

The juncture of surfaces 40 and 42 forms the crest of sections 15. These crests do not follow the same helical arrangement as the knives 16 since each knife is stepped from the preceding surface 42 to accommodate the wafer to be cut. The helix angle of the knife arrangement is larger than that generated by the crest of each section 15. The crest of each section 15 extends from immediately behind the juncture of the two edges 24 and 28 of one knife to the extreme point of engagement of the edge 28 of the next succeeding knife, when cutting wafers of the preset thickness. (This will be a projection of the crest as the face 42 of the sections 15 terminates short of the said next succeeding knife.) The mid-line of the surface generated by extending the surfaces 40 to form one continuous ridge as ridge 13 will, of course, match with the knife arrangement and will have the same helix angle as the knife arrangement.

Surface 42 of each section 15 extends between adjacent knives, as illustrated in FIG. 5. As shown, each section 15 recedes into the drum body gradually between the rear of one knife and the subsequent knife of the helix. In other words, the radial distance to the surface 42 immediately behind the knife is shorter than the radial distance just ahead of each knife 16, as is evident at points A and B respectively, of FIG. 5. The change in radial distance between points A and B will be equal to the thickness of the chip to be produced. This surface 42, properly contoured, serves to steady the log being fed to the chipper. The slope of the surface 42, as illustrated, depends on the depth of cut or wafer thickness and the spacing between sequential knives.

In operation, a plurality of successive cuts are made by the succession of knives around the helix. These cuts, as shown schematically as 1, 2, 3, to 8 in FIG. 6, form the stepped configuration on the log as it proceeds through and is reduced by applicant's apparatus. Each sequence of 8 cuts illustrates the cuts made on each 360° of the helix for the specific example given herein. As shown, a face 37 is formed in the log by the edge 24 of the last knife to cut (cut 8 in FIG. 6) while a surface 38 is formed by the succession of cuts of the wing edges 28 of the respective knives producing cuts, 1, 2, 3, etc. Engagement between this surface 38 and the surface 40 of the ridge 13 prevents overfeeding of the log.

In the described example, using 8 cuts per revolution and assuming the chip length of 1 inch (length in fibre direction), chip thickness of ⅛ inch and the knives arranged on a single helix (i.e. only one ridge 13) then the log advances one inch for each revolution of the drum.

The surface 40 or surfaces 40 prevent overfeeding of the log 35 by engagement of the face 38 with said surface 40. Thus, it is possible to use simply a gravity feed with the face 40 controlling the rate of advance. It is preferred, however, to use some simple log feeder to present the wood to the machine and to correlate the feed so that the friction between the face 40 and log 35 will be held to a minimum. The face 40 will, in particular, regulate the feed of the log after it is too short to be held and controlled by the feeding means.

The operation of the waferer is as follows: a log 35 is fed along the trough 22 into the drum 10 by a controlled feed means which advances the log in accordance with the speed of the drum. The knives 16 engage in succession and carve segments of helical steps into the log while simultaneously producing wafers. These steps completely reduce the log to wafers at the point where the trough 22 and the interior of the drum meet. During the cutting operation, the log 35 is steadied and prevented from over-feeding by the surfaces 42 and 40 respectively, of the segments 15. The feed of the last short length of the log, in particular, is controlled by these segments 15 since this last short length will be free from direct control by the external feed means except as advanced by the next log.

Since the cutting edges 24 of knives 16 are mounted parallel with the trough 22, as above described, the wafers are cut substantially parallel to the grain of the log and the length of the wafers in the direction of the fibres is determined primarily by the length of the edge 24 which extends beyond surface 40. The edge 28 frees the wafers by severing across and at a slight angle to the grain and the wood thus cut leaves the drum 10 through the passageways 34 provided for this purpose.

The passageways 34 have been shown as following directly along the knife as a matter of convenience of illustration only. In a production model, suitable chip breaker means may be provided and the passage would be designed to accommodate the centrifugal force factor and the resultant direction of ribbon feed.

In FIG. 7 there is illustrated another embodiment of the present invention. In this figure, the drum has been replaced by a frustro-conical head 50. A plurality of knives 16 are mounted in a spiral pattern that gradually reduces in radius in accordance with the frustro-conical configuration of the head 50. The knife arrangement and the type of knife used is similar to that used with the embodiment of FIG. 1. As shown in FIG. 7, the knives 16 are mounted on helical steps 52 provided with faces 53 and 54. The face 54 recedes into the head 50 along the helical path and provides a control face similar to the face 40 of FIG. 1 to limit the feed of log 35. The surface 53 trails each knife and functions in the same manner and is similarly shaped to surface 42 of the above-described embodiment.

A similar system to that illustrated in FIG. 7 but having a conical shape with the knives and helical step extending from the outer surface of the head may also be used. As with the inner surface, the outer helical step or steps will be arranged to control the log and the knife edges will extend from the step or steps to engage the logs substantially parallel to their grain. Regardless of whether the cutting edges project inwardly or outwardly, when using the conical shape, each surface 53 will extend as an arc on a fixed radius about the axis of the drum. The radii of consecutive surfaces will differ by the depth of cut or wafer thickness.

The mid-point of the surface 54 or the arrangement of knives 16 about the head 50 irrespective of whether the cutting edges extend from the outer or inner surface are arranged on a path of constant pitch about the head 50 in the illustrated embodiment.

It is evident that as with the other embodiments, the tapering head also permits the use of discrete sections similar to sections 15 or the face 54 may be continuous to form a continuous ridge similar to ridges 13.

The operation of the embodiment of FIG. 7 is similar to that of FIG. 1. Logs are fed into the head while supported against the trough 22 by any suitable feed means including gravity. The axial distance between adjacent knives spaced 360° about the head 50 is a function of the effective length of edge 24 plus the sum of a component of the cut by the wing 26 of each knife on the 360° increment of the helix. The axial feed of the log per revolution equals the length of wafer cut or the length of edge 24 in the axial plane. The same number of knives are maintained per 360° of the helix regardless of the diameter at any location along the head in the illustrated embodiment.

The embodiment of FIG. 7 with the knives and steps 52 projecting internally or externally of the conical head 50 has advantages over the remaining embodiments disclosed in that a wafer of a more uniform thickness will be produced. The angle of cutting edges 24 of the various knives does not vary relative to the log axis as the knives rotate relative to the log and thus a more uniform grain direction in the wafers is obtainable.

In the embodiment of FIG. 8, a disc 70 is used instead of the drum 10 or frustro-conical head 50. Knives of the type used in the other two embodiments are arranged in a spiral on one face of the disc. As shown, a spiral ridge 74 extends outward from the face 72 and the knives 16 are mounted with their cutting edges 24 extending from surface 75 of this ridge. The opposite surface 76 to said surface 75 serves the same function as the surfaces 40 and 54 of the embodiment of FIGS. 1 and 7 respectively, while the surface 75 is contoured similar to surface 42 of FIGS. 4 and 5. As shown, a trough 22 is also provided in this embodiment parallel or substantially parallel to the direction of feed at the mid-point of penetration (assuming a V-shaped trough) and the profile of ridge 74 is determined in the same manner as for FIGS. 1 and 7.

The operation of the chipper of FIG. 8 is similar to that of the other machines described. Wood is fed along the trough 22 to the disc 70. The surface 75 steadies the log while the surface 76 prevents overfeeding of same. The knives 16 reduce the size of log 35 so that it can proceed deeper between the feed trough 22 and the disc 70 until finally the whole log is reduced to wafers.

Referring to FIGS. 9 and 10, there is shown a further embodiment of the invention. These figures show an arrangement similar to that illustrated in FIG. 1, but in the FIG. 9 embodiment, the cutting edges of the various knives 16 project from the external surface of the drum 10A. As shown, continuous ridge 13A made up of a plurality of discrete sections 15A, extends from the outer surface of the drum. Each section 15A is substantially triangular and is provided with a pair of faces 40A and 42A corresponding to faces 40 and 42 of sections 15 of the FIG. 1 embodiments. As illustrated, the face 40A of each section 15A has been projected to form a continuous surface extending as a helix about the drum. Suitable chip gullets 41A are provided in advance of each of the knives 16. The configuration of the sections 15A will be determined in the same manner as the configuration of sections 15 was determined for the FIG. 1 embodiment.

As is evident, each of the knives 16 are mounted substantially parallel to the direction of feed (i.e. edges 24 parallel to the grain of the log at about the mid-point of its engagement with an average diameter log). In this embodiment, as shown in FIGS. 9 and 10, the trough 22A is L-shaped rather than V-shaped, as in the previous FIG. 1 embodiment. With this L-shaped trough, the bisector of the vertex angle does not pass through the axis of the drum, while the bisector of the vertex angle of the V-shaped trough 22 is radial and passes through the axis of the drum. A V- or L-shaped trough or any other suitable shaped means may be used to direct the wood to the knives 16. These means to direct the wood to the knives need not extend axially of the chipping head.

Applicant prefers to stagger the knives 16 in adjacent rows longitudinally of the drum or wafer cutting head as shown in FIG. 9. By staggering the knives and thus their trailing steadying surfaces such as 42, 53, 75 or 42A, more stable conditions may be maintained in particular with smaller logs and the ends of logs. While this is particularly true when large gullets are used in advance of each knife, it is also applicable to embodiments with the knives projecting internally and having passages for exit of the wafers produced.

It is usually preferred not to use a continuous ridge similar to ridge 13, but it is more economical in production to make each section 15 or 15A as a unit and to apply same in properly oriented relationship onto the cutting surface of the wafering head. This applies regardless of the arrangement used.

As above-stated, with a V-shaped feeding trough extending axially of the head, the edges 24 of the knives are preferably mounted so that they are parallel to the direction of log feed at the mid-point of their cut. With an L-shaped feeding trough, it is preferred to mount the edges 24 parallel to the direction of feed at the mid-point of their cut on a log of average diameter to be processed.

The number of knives per 360° must, once chosen, be held constant for any given unit if the wafer thickness is to be maintained substantially constant as described above. Similarly, the pitch of the knife arrangement or arrangements must be held constant along the cutting head. The above conditions apply to any of the embodiments of the invention using a cylindrical cutting head.

The parallelepiped wafers produced with the present invention are approximately the same shape and size as conventional chips and thus require no special machines for handling. Each wafer has four cut faces as seen in FIG. 10 at 60, 62, 64 and 66. Faces 60 and 62 correspond to faces cut by the main cutting edge 24 of each knife while parallel faces 64 and 66 are cut by the edge 28. The remaining two faces 68 and 70 result when the ribbon 36 is split into individual wafers. Each of these faces have parallelogram shapes. The parallelepiped wafer of the present invention is unique in its parallelepiped shape and also in grain direction since the grain does not run perpendicular to the edges 64 and 66 but is at a slight angle depending on the helix angle of the knife arrangement. Since the knives 16 do not move at right angles to the fibres as with prior devices for producing pulping wafers, the parallelepiped wafers of this invention are produced by a slicing action. This action results from the advance of the log substantially perpendicular to the direction of movement of the knives, simultaneously with the severing by knives 16.

Applicant's wafers have a length in the fibre direction that is substantially constant (i.e. length cut by edge 24). Applicant has also been able to maintain approximately the same shape as conventional chips while maintaining a preset thickness and length, and at the same time reducing end compression damage that accompanies conventional chipping.

Wafers may be produced having a thickness of $t = \frac{1}{16}''$ to about $\frac{1}{2}''$, say about $\frac{1}{8}''$; a length L in the fibre direction of $\frac{1}{4}''$ to $2''$, say about $1''$ and an angle between the fibre direction and a perpendicular to the edges of sides 64 or 68 of the wafer in the order of about 1° to 15°. The edges of ends 68 and 70 extend at the same angle to sides 64 and 68 as the grain, since these ends 68 and 70 are formed by cleavage along the grain.

While applicant has disclosed several types of apparatus, other forms of the invention will be readily apparent to those skilled in the art. Applicant has disclosed only one form of knife, but other suitable forms may also be used. Thus, applicant has disclosed a system of continuously wafering logs.

Also, applicant has disclosed only a single feeding means to direct the log to the wafering head in each embodiment. A plurality of such feed means may be provided about the heads as desired. The conical drum type arrangement is ideally suitable to the use of more than one feed, since each feed extends axially of the head and a single feed station could supply each separate feed means.

I claim:

1. A waferer for reducing random length logs to wafers including: a wafering head, a surface on said head, a plurality of discrete cutting edges arranged in a spiral path about said surface, each of said cutting edges comprising a main cutting edge and an auxiliary cutting edge, a V-shaped cross section projection extending from said surface between each consecutive knife in said path, one surface of said V-shaped projection being substantially parallel and trailing each said main cutting edge, the other surface of each said V-shaped projection being substantially parallel to and trailing each said auxiliary cutting edge, the length of said one surface in an axial plane being equal to the effective length of said main cutting edge and the average length of said other surface being equal to the number of cutting edges per 360 degrees of said spiral path multiplied by the effective length of the auxiliary cutting edge, said main cutting edge of each consecutive knife being stepped from the trailing end of each said one surface, said one surface being positioned to engage and steady a log fed to said head and said other surface being positioned to engage and prevent overfeeding of said log.

2. A wafer as defined in claim 1, further including means for directing logs axially toward said cutting head in a predetermined direction, said predetermined direction and said main cutting edges being parallel at at least one point in the engagement of each said cutting edge with a log being reduced.

3. A cutting head for a waferer comprising a surface, a plurality of discrete knives extending from said surface and arranged in a spiral path of constant pitch about said surface, each said knife having a main cutting edge and an auxiliary cutting edge, a control surface trailing and parallel to each said main cutting edge, a second control surface trailing and parallel to each said auxiliary cutting edge, said first and second control surfaces forming a V-shaped cross section element trailing each said knife, said first control surface positioned to engage and to steady a log presented to said head, and said second control face extending along said spiral path preventing overfeeding of a log presented to the head.

4. A cutting head for a waferer comprising a plurality of knives arranged in a helix on a cylindrical surface, a discrete V-shaped cross section element trailing each of said knives, the line traced by the mid-point of one face of said V-shaped ridge being on the same helix angle as said knives are arranged and positioned to prevent overfeeding of a log presented to said cutting head, the other face of said V-shaped element extending substantially parallel to a cutting edge of the immediately preceding knife, each said element being of tapering thread configuration.

5. A waferer comprising a wafering head having a cylindrical surface, a plurality of cutters arranged in a helical pattern on said cylindrical surface, each of said cutters having a main cutting edge and an auxiliary cutting edge extending at an angle from said main cutting edge, a discrete V-shaped cross section ridge trailing each said cutter and having one surface parallel to said main cutting edge and the other surface parallel to said auxiliary cutting edge, each of said cutters extending from said cylindrical surface substantially the same distance, each of said ridges being a section of tapered thread configuration, said other surface extending along said cylindrical surface on a helix the angle of which is the same as that of the cutter pattern, said one surface following a path such that each succeeding cutter will be stepped relative to the trailing end of each said one surface, said one surface being positioned to engage and to steady a log presented to said wafering head and said other surface being positioned to prevent overfeeding of said log.

6. A waferer as defined in claim 5 further comprising means to direct logs to be reduced to wafers axially to said head at a predetermined angle to the axis of said head, said predetermined angle and the angle of said main cutting edge to the axis of the drum being substantially equal.

7. A waferer as defined in claim 6 wherein the axial cross sectional length of said one surface is equal to the effective cutting length of said main cutting edge and the average length of said other surface is equal to the effective cutting length of said auxiliary cutting edge multiplied by the number of knives per 360° of said helical pattern.

8. A waferer for reducing random length logs to wafers comprising a frusto-conical cutting head rotatable about its axis, a sequence of a plurality of knives mounted on a spiral path about said head, each said knife including a main cutting edge and an auxiliary cutting edge extending at an angle to said main cutting edge, each knife in said sequence being mounted with its main cutting edge stepped radially a predetermined distance from the preceding knife in the sequence, a first control surface trailing and parallel to each main cutting edge, said control surface extending on an arc of the same radius as the main cutting edge of the immediately preceding knife is mounted, a second control surface extending about said head on a spiral of a pitch equal to the pitch of said spiral path, each said auxiliary cutting edge and a section of said second surface being substantially in the same plane.

9. A waferer as defined in claim 8 wherein said main cutting edges extend parallel to the axis of said head and wherein the axial length of said one surface is equal to the effective cutting length of said main cutting edge.

10. A waferer as defined in claim 9 further comprising means to direct logs axially to said head with the grain of said logs substantially parallel to the axis of said head.

11. A waferer as defined in claim 10 wherein said knives are mounted on the exterior of said head and suitable chip gullets are provided in advance of each knife.

12. A waferer for producing wood wafers comprising; a wafering head, a plurality of discrete cutting edges arranged in a spiral about the surface of said head, elements on said surface between consecutive knives in said spiral, a control surface on each of said elements, said control surface being positioned to engage a cut surface on a log presented to said waferer and thereby to continuously control said log.

13. A waferer for reducing random length logs to wafers comprising; a wafering head rotatable upon an axis, a plurality of discrete knives on said head, each said knife having a main cutting edge and an auxiliary cutting edge extending at an angle to said axis, said knives being arranged on a spiral path extending about the surface of said head, a V-shaped cross-section ridge extending from said surface between consecutive knives on said path, one surface of each of said ridges being substantially parallel to and trailing a main cutting edge of the immediately preceding knife, said one surface being positioned to engage a cut face formed on a log presented to said waferer by said immediately preceding main edge whereby said log is steadied, the other surface of said V-shaped ridge extending at an angle to the axis of the head equal to said angle of said auxiliary edge, said other surface substantially passing through the plane of each of said auxiliary cutting edges.

14. A waferer as defined in claim 12, wherein each of said discreet cutting edges includes a main cutting edge and an auxiliary cutting edge projecting at an angle from one end of said main cutting edge.

15. A waferer as defined in claim 14, wherein said control surface is substantially parallel to said auxiliary cutting edge and is positioned to engage a surface cut on said log by said auxiliary cutting edge thereby to continuously prevent overfeeding of said log.

16. A waferer as defined in claim 14, wherein said control surface is substantially parallel to said main cutting edge and is positioned to engage a surface cut on said log by said main cutting edge whereby to continuously steady said log.

References Cited by the Examiner

UNITED STATES PATENTS 3,216,470  11/1965  Nilsson _____ 144—172 X

WILLIAM W. DYER, JR., *Primary Examiner.*

W. D. BRAY, *Assistant Examiner.*